United States Patent [19]
Kukurba

[11] 4,279,220
[45] Jul. 21, 1981

[54] AUTOMATIC FEEDING DEVICE

[76] Inventor: Walter Kukurba, 110 Peckham St., Port Charlotte, Fla. 33952

[21] Appl. No.: 94,590

[22] Filed: Nov. 15, 1979

[51] Int. Cl.$^3$ .................. A01K 5/02; A01K 61/02
[52] U.S. Cl. ........................ 119/51.11; 119/52 A; 119/56 R; 222/406
[58] Field of Search ............. 119/51.11, 51.12, 51.13, 119/56 R; 222/406, 407, 228

[56] References Cited

U.S. PATENT DOCUMENTS

| 829,204 | 8/1906 | Hackburn et al. | 222/407 X |
| 928,949 | 7/1909 | Deppe | 222/407 X |
| 2,059,482 | 11/1936 | Olson | 222/407 X |
| 3,800,745 | 4/1974 | Fassauer | 119/51.11 |
| 4,027,627 | 6/1977 | Fillion | 119/51.11 |

FOREIGN PATENT DOCUMENTS 129839  1/1929  Switzerland .................. 222/228

*Primary Examiner*—Gene Mancene
*Assistant Examiner*—Robert P. Swiatek
*Attorney, Agent, or Firm*—Hauke and Patalidis

[57] ABSTRACT

An automatic feeding device comprising a storage bin or hopper containing dry fodder, a feed delivery port or aperture at the bottom of the storage bin, a feed delivery mechanism forcing a quantity of feed through the aperture, and a prime mover, such as an electric motor, driving the feed delivery mechanism. The electric motor is controlled by a timer which, at a pre-set time, causes a delivery of a first quantity of feed through the delivery port, and, after a pause, causes a delivery of a second quantity of feed. The storage bin may be cylindrical in shape, the feed delivery port being at the far end of a spiral or tangential chute extending from the storage bin, the delivery mechanism comprising at least one rotatably driven elongated thin flat flexible blade. The automatic feeding device may also provide a feed agitator stirring the feed in the storage bin above the delivery mechanism.

7 Claims, 4 Drawing Figures

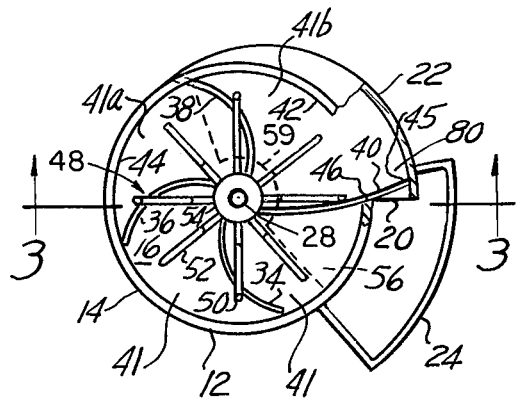

AUTOMATIC FEEDING DEVICE

BACKGROUND OF THE INVENTION

The invention relates to an automatic feeding device for delivering dry particulate feed to animals in aquariums, cages, stables or outdoors.

Automatic feeding devices have been developed in the past to meet particular needs of owners of animals, most often owners of aquatic pets. This is probably due to the fact that, while other types of animals may simply gorge themselves and then ignore excess feed if given too great a supply, fish cannot escape the effects of the overfeeding. At best, the aquarium will become excessively cloudy and algae growth will accelerate, and, at worst, the fish will be killed. Thus, such devices as those disclosed in U.S. Pat. No. 3,874,340 using the air supply to an aquarium to time the supplying of food, and U.S. Pat. No. 3,993,028 continuously supplying a small amount of food at a time, have been developed, but still may result in overfeeding.

Other automatic feeding devices designed for animals include those disclosed in U.S. Pat. Nos. 3,605,679 and 3,993,028 and West German Pat. Nos. 1,507,080 and 2,230,747. All these devices deliver the fodder in a sudden single feeding. If different sizes or kinds of animals are kept together, larger and more aggressive animals will devour most of the feed, leaving the smaller, slower, and more timid animals with little or no nourishment.

What is needed, therefore, is a feeding device adaptable to the needs of the animals being fed, preferably supplying the feed slowly or in two or more offerings per feeding time. The larger and more aggressive animals can eat first and satisfy their gluttony with less feed, allowing the more timid animals a greater chance for surviving.

SUMMARY OF THE INVENTION

The present invention provides a novel automatic feeding device adaptable to the needs of animals being fed comprising a storage bin containing a quantity of feed, and a feed delivery port or aperture, preferably at the end of a short spiral or tangential channel or chute extending from the lower portion of the storage bin. A motor, or other power means, drives a blade or other delivery means such as to push a small quantity of feed out along the chute and through the port or aperture so that the animals may reach it. A timer is provided to start at a pre-set time the drive motor such that a first quantity of feed is delivered. After a pause, the timer restarts the motor to deliver a second quantity of feed. Agitating means, preferably coupled to the motor, or other drive means, may be provided to stir the feed contained in the storage bin.

Further objects and advantages of the present invention will become apparent to those skilled in the art when the following detailed description of an example of preferred embodiment is read in conjunction with the accompanying drawing wherein like reference numerals refer to like components throughout, and wherein:

BRIEF DESCRIPTION OF THE DRAWING

FIG. 1 is a side perspective view of an automatic feeding device according to the present invention;

FIG. 2 is a top plan view of the feeding device of FIG. 1 with the cover removed, and with a portion broken away;

FIG. 3 is a cross-sectional view substantially along line 3—3 of FIG. 2; and

FIG. 4 is a bottom plan view thereof.

DETAILED DESCRIPTION OF THE INVENTION

Referring now to the drawing and more particularly to FIGS. 1 and 3 thereof, illustrating an example of structure of an automatic feeding device 10, the present invention comprises a cylindrical enclosure or shell 12 defining a feed supply or storage bin 14 disposed above a floor or base plate 16 and a motor compartment 18 disposed below the floor or base plate 16. A feed outlet port or aperture 20, in the example illustrated, is disposed at the far end of a spiral channel or chute 22 extending from the lower end of the feed storage bin 14 and which shares the floor or base plate 16 therewith, the floor 16 being provided with an extension 80 forming the floor of the spiral channel 22. A feeding trough 24 is shown mounted to the periphery of the cylindrical shell 12 below the port 20. A cover 26 is screwed onto or otherwise fastened to the top of the storage bin 14 to protect the feed therein. Optional means, not shown, may be provided to protect the feed in the trough 24 from rain, such as for example, an awning-like extension from the shell 12 thereabove, not shown. As best seen at FIG. 3, the storage bin 14, the floor 16, the motor compartment 18 and the trough 24 may be molded from a single piece of plastic, or may be assembled, alternatively, from a number of sheet metal stampings.

FIGS. 2 and 3 illustrate the internal mechanical structure of the automatic feeding device 10. A drive shaft 28 extends upward from the center of the floor or base plate 16 of the storage bin or hopper 14, the shaft being driven clockwise by a drive and timing mechanism 30 located below the floor 16 in the motor compartment 18, and described in greater detail hereinafter. An appropriate bearing 32 is fitted to the shaft 30 where it passes through a bore in the floor or base plate 16. A plurality of identical elongated thin flat rectangular flexible blades or impellors 34–40, numbering four in the example shown, are coupled to the drive shaft 28 proximate the floor 16 and defining between each other a plurality of compartments 41. The blades 34–40 are greater in length than the inside radius of the storage bin or hopper 14 and are thus, in general deflected or bowed as shown in FIG. 2 with respect to blades 34, 36 and 38. A rectangular slot 42 in the inside wall 44 of the storage bin or hopper 14 allows the blades to enter the spiral channel or chute 22, the blade unwinding as the tip 45 of the blade progresses further into the channel, as shown at FIG. 2 with respect to blade 38, until, at the end of the channel 22 proximate the port 20, the blade is fully or almost fully straightened, as shown with respect to blade 40. As the blade 40 is further advanced by the rotation of the shaft 28, the edge 46 of the slot 42 deflects the blade such that it is again progressively bowed as shown with respect to blades 34 and 36.

Also coupled to the shaft 28 is an agitator 48 which, in the example illustrated, consists of four sets of wire blades 50 and 52 extending from a sleeve 54 keyed to the shaft 28. Each wire blade 50 and 52 is bent 90° at three points along its length, such as to form a square U-shaped whip. One set of blades 50 extend from the upper portion of the sleeve 54. The other set 52 extend from the lower portions of the sleeve 54 and is mounted upside-down with respect to the first set 50. By alternatingly mounting the four sets of blades 50 and 52 around the perimeter of the sleeve 54, an effective mixing of the feed may be obtained. Alternatively, only one or two sets of blades may be used.

Also shown in FIG. 2 in phantom line and in FIG. 3 in solid line is an optional shield 56 located between the agitator 48 and the flexible blades 34–40 and mounted by means of a pair of guides 58 on the inner wall 44 of the food storage bin or hopper 14. The shield 56 is shaped approximately like a 30–50% pie slice with a circular portion 59 cut away for clearance of the sleeve. The shield 56 may be constructed of the same material as the shell 12 and may be very thin. The mounting guides 58 may be a series of ridges or circular extensions molded into or mounted to the inner wall 44 of the shell 12.

As shown in FIG. 4, the power means consists of an electric motor 60 secured by a bracket 62 below the floor 16, the motor 60 having an output shaft coupled to a gear 64 keyed on the end of the shaft 28 through a pinion, not shown. The motor 60 is started and stopped by a clock or timer 66 secured below the floor 16 by a bracket 68 and is supplied with electrical power from a battery 70 or alternatively, from an external power source. One or more concentric shafts 72 from the timer 66 pass through a bore in the sidewall 44 of the shell 12. Mounted on the outer surface of the shell 12 to the end of the shafts 72 are the face, hands and controls 74 for the timer or clock 66, as is well known in the art. In the example illustrated, the timer controls 74 are located below the feed outlet channel or extension 22, minimizing the risk of damage to the controls by the animals to be fed.

In operation, feed is loaded into the storage bin 14 whenever convenient. When the timer 66 starts the motor 60, the motor drives the shaft 28 through the pinion (not shown) and the gear 64, the gear 64 being comparatively larger than the pinion so as to reduce the speed of the shaft 28 with respect to the speed of the output shaft of the motor 60. The drive shaft 28 causes the agitator 48 to rotate, mixing the feed in the bin. Simultaneously, the shaft 28 rotates the blades 34–40 which in turn push the feed in the compartments 41 therebetween along a circular path. As each blade enters the channel 22 (blade 38, FIG. 2), the feed compartment 41a behind it increases in size, and thus additional feed from above descends into it. When the leading blade encounters the edge 46 of the slot 42 (blade 40, FIG. 2), and is deflected, the feed compartment 41b is thereafter open to the aperture 20. As the blades continue to rotate, the blade projecting into the spiral channel 22 forces a portion of the feed along the spiral path of the channel 22 through the aperture 20.

Depending on the size of the feed particles, the frictional forces between the particles themselves, and the frictional forces between each particle and the wall 44 of the feed bin 14, an additional quantity of feed particles will descend due to gravity into the feed compartment 41b as a portion of the feed passes through the aperture or port 20. Thus, the quantity of feed actually delivered depends not only on the shaft speed and the dimensions of the bin, channel, and port, but also on the characteristics of the feed particles. The actual amount of feed delivered per feeding may be adjusted by varying the number of revolutions of the shaft per feeding. The optional shield 56 also helps reduce the amount of feed delivered by isolating the feed compartment 41b from the main supply of feed thereabove during the time when it is open to the port 20. This is particularly desirable where the feed would otherwise tend to spill out the port 20 due to gravity even with the blades 38–40 stopped.

The example of structure illustrated and described above is adaptable for feeding birds and other small animals, or it may be made in a large size to feed large animals. For large animals, the cover 26 is preferably permanently or semi-permanently affixed to the shell 12, and a smaller opening, preferably with a door, is provided near the top of the storage bin 14 for filling the storage bin. The preferred size of the assembly and particularly of the storage bin 14 is also dependent on the number of feedings desired between refills.

The feeding device of the present invention may be further modified and improved to meet the needs of the animals feeding therefrom by a modification of the timer 66, as is well known in the art, to provide at least two start signals so that the apparatus provides the fodder in two or more offerings per feeding time. While the timer is set by the operator for one time, the timer automatically starts the motor 60 once to provide, for example, 40–80% of the feed needed for this meal, then pauses before restarting the motor to provide the remaining 20–60% of the feed. Alternatively, three or more offerings may be provided per feeding.

In the case of an aquarium, a feeding apparatus according to the present invention may be affixed to the aquarium tank wall above the surface of the water or, alternatively, to the cover over the aquarium. For this use, the trough 24 is omitted so that the feed leaving the aperture port 20 falls directly into the outlet water. If desired, the aperture or port may be located at the bottom 80 of the spiral channel 22 instead of at the end thereof, and the motor compartment may be located above the feed bin to avoid exposing the electrical components to the water.

Having thus described the present invention by means of a detailed description of the best mode contemplated at the time of filing for carrying out the invention, modification whereof will be obvious to those skilled in the art, what is claimed is as follows:

1. An animal feeding device comprising a feed storage bin in the form of an enclosure having a cylindrical side wall and a flat bottom wall, a rotatable shaft vertically extending from said bottom wall, means for driving said shaft in rotation, at least one elongated rectangular flexible blade mounted on said shaft and extending generally radially from said shaft, said flexible blade being disposed with an edge in sliding engagement with said bottom wall and a tip in engagement with said side wall, said blade having a length greater than the radial distance from said shaft to said cylindrical wall for causing said blade to be normally elastically bowed in the direction of rotation of said shaft, a spiral enclosed channel disposed at a portion of the periphery of said enclosure, said spiral channel having a floor disposed coplanar with said flat bottom wall, a slot for accepting the tip of said blade formed in said cylindrical side wall and placing said spiral channel in communication with the interior of said enclosure whereby at least the tip of said blade extends into said spiral channel as said blade rotates, an outlet aperture at the end of said spiral channel, power drive means for rotating said shaft, and timing means for energizing said power drive means at timed intervals for predetermined time durations.

2. The feeding device of claim 1 further comprising a trough disposed below said outlet port.

3. The feeding device of claim 1 further comprising feed stirring means mounted on said shaft above said blade.

4. The feeding device of claim 3 wherein said feed stirring means comprises at least one substantially rigid blade having a U-shaped central portion extending vertically downwardly and one substantially rigid blade having a U-shaped central portion extending vertically upwardly.

5. The feeding device of claim 4 further comprising a stationary plate disposed between said flexible blade and said feed stirring means, said stationary plate separating said enclosure into upper and lower compartments, and a substantially large opening in said plate placing said upper compartment in communication with said lower compartment.

6. The feeding device of claim 1 wherein said timing means engages said power drive means to rotate said blade to deliver through said outlet aperture a fraction of the feed required for a complete feeding followed by a delivery of the remaining of the feed required for a complete feeding, said deliveries being separated by a time interval during which no feed is delivered.

7. The feeding device of claim 1 wherein said shaft drive means, said driving means and said timing means are mounted in a separate compartment disposed below said flat bottom wall.

* * * * *